May 2, 1950 M. MEUNIER 2,505,867
APPARATUS FOR EXAMINATION OF
MATERIALS BY ELASTIC WAVES
Filed Dec. 13, 1947
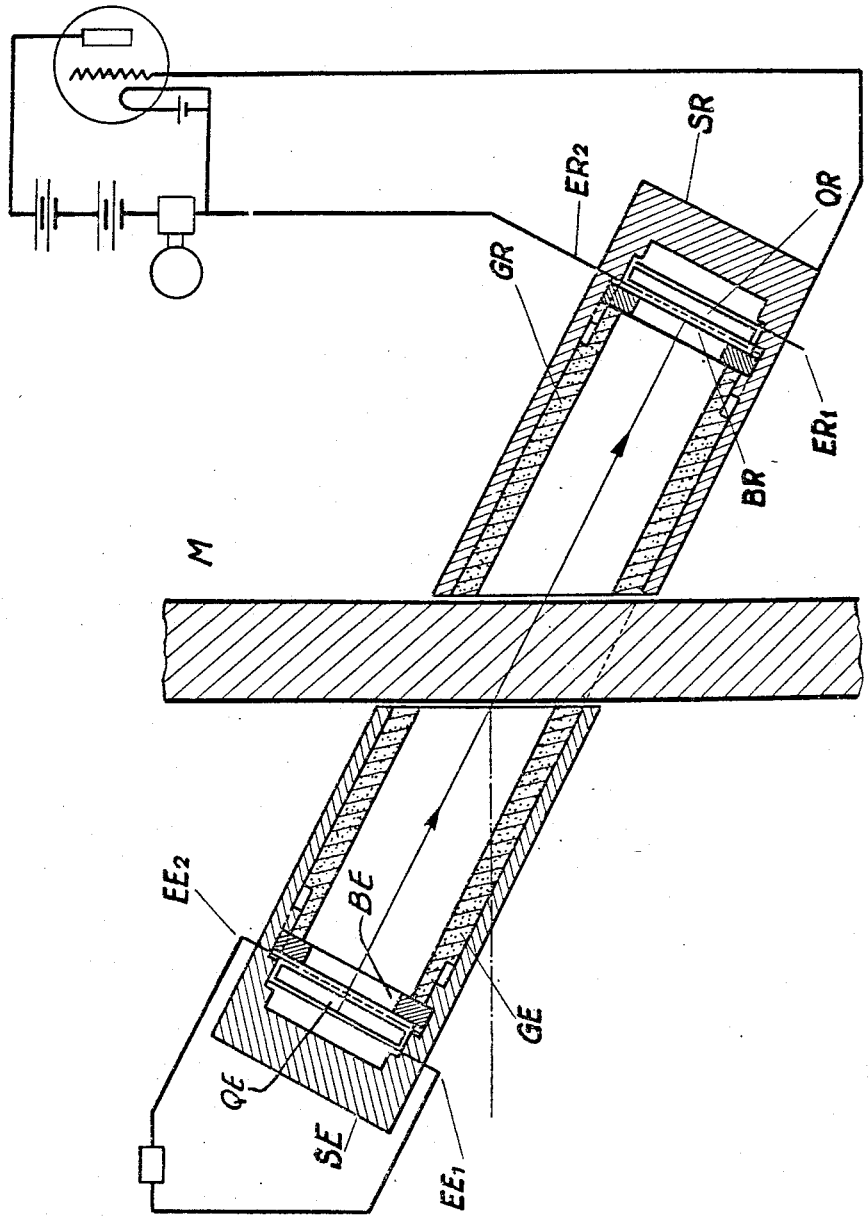
INVENTOR:
MARCEL MEUNIER
By: John H. Graham
HIS AGENT Patented May 2, 1950

2,505,867

UNITED STATES PATENT OFFICE 2,505,867

APPARATUS FOR EXAMINATION OF MATERIALS BY ELASTIC WAVES

Marcel Meunier, Cuesmes, Belgium, assignor to Ateliers de Constructions Electriques de Charleroi, Brussels, Belgium, a Belgian societe anonyme Application December 13, 1947, Serial No. 791,581
In France December 16, 1946

2 Claims. (Cl. 73—67)

This invention relates to the examination of materials such as solid bodies by means of elastic waves.

It is known that elastic waves, as for example sound waves and particularly ultra-sonorous or supersonic waves, can be used for the examination of various materials in order to locate common defects, without thereby destroying the shape or constitution of the body made of such material.

The present invention has for its primary object to provide an improved apparatus for examination of materials by means of elastic waves, in particular for the purpose of detecting and locating possible defects or flaws in such materials.

Another object of the invention is to provide an apparatus for examination of materials comprising the use of a beam of single frequency supersonic waves impinging on the material at an acute angle smaller than the angle of total reflection at the surface, the wave generating device being located at such a distance from the said surface that the part of the waves reflected thereby is directed clear of the said generating device, while the wave receiver is similarly arranged on the other side of the material so as to receive the transmitted beam at the same angle of incidence.

A further object of the invention is to provide improved apparatus for examination of materials by supersonic waves, in which the wave generator and receiver are each sheathed with a substance adapted to absorb reflected supersonic waves, thereby preventing the formation of stationary waves between the material under examination and the devices for generating and receiving the supersonic waves.

Other features and advantages of the invention will become apparent from the following description with reference to the accompanying drawing, which is given by way of a non-limitative example.

Elastic waves are, in many cases, more efficient than X-rays and other electromagnetic radiations commonly used for the examination of materials, since they enable defects to be discovered which are imperceptible by such radiations, and they can be used for thicknesses of materials which are completely opaque to these same radiations.

The investigation of materials by means of elastic waves, such as sonorous or ultra-sonorous waves and preferably by means of ultra-sonorous or supersonic waves, is particularly simple. Examination for testing purposes is effected by subjecting the material to be inspected to ultrasonorous waves, for example by placing it between a device for emitting such waves and a device for receiving these same waves.

The beam of ultra-sonorous waves which is directed towards the material penetrates therein more or less easily, a portion thereof being reflected. The degree of reflection depends on the nature of the media present, and the angle of incidence of the beam of ultra-sonorous waves. The same effect is repeated when possible reflections occur inside the material to be inspected, at the contacting surfaces of any break in the material such as inclusions, porosity, etc. The propagation of the ultra-sonorous waves is practically stopped even by a thin film of air or gas, however thin it may be and imperceptible to Roentgen rays, whereas the remainder of the material behaves like a transparent material.

In practice, the devices for emitting ultra-sonorous waves may comprise a quartz crystal or any other piezo-electric device, excited by the electrical vibrations of a suitable generator of high frequency oscillations. By the effect of said oscillations, the piezo-electric device vibrates mechanically and these vibrations can be transmitted to all kinds of media.

The quantity of ultra-sonorous waves which has passed through the material to be examined can be measured by means of a high frequency receiving device which is equipped with an indicator of any suitable kind, for example a voltmeter across its output terminals, this indicator being connected to a piezo-electric device operating in the opposite manner to the emitting crystal.

The transmission of the ultra-sonorous waves through the material to be examined, according to the simple method of investigation hereinbefore described, is however accompanied by disturbing phenomena.

The difficulties which are encountered in practice when this elementary device is used are mainly due to the untimely resonances which occur either between the piezo-electric emitting device and the material, or between the material and the piezo-electric receiving device, or between successive faces of the material.

Since, in practice, the transmission of the ultra-sonorous waves is preferably effected under water, and owing to the fact that the frequencies used correspond to supersonic wavelengths, such being (in water) of the order of one millimetre, considerable instability is experienced in the reading, corresponding to increases or decreases of intensity due to the rises or nodes of pressure produced by resonance effect, since differences of distance or thickness amounting to a fraction of a millimetre may cause a change from operation with progressive or travelling waves to operation with stationary waves.

These difficulties are therefore commonly encountered in practice, in particular when making a mass examination of various materials, it being possible for the devices for emitting and receiving the ultra-sonorous waves to be manipulated by hand.

In order to overcome this drawback, it has already been proposed to vary the frequency of the ultra-sonorous waves so as to eliminate the resonance effect.

Since the sources of ultra-sonorous waves commonly used comprise piezo-electric crystals excited by electrical oscillations, it is possible to vary the frequency of the waves by frequency modulation of the exciting oscillations. This problem has already been solved, but the following objections arise in respect thereof:

(a) the oscillation resonance curve of a piezo-electric crystal is rather sharply pointed, so that the crystal has only a narrow resonance band;

(b) for the particular application to the examination of materials by means of ultra-sonorous waves, the frequency modulation solution requires a very high speed of variation;

(c) the practical embodiments of apparatus for such frequency modulation must not comprise a mechanical device, which would necessitate rapid variations of the characteristics of the oscillating circuit, nor an electrical device which would require numerous and complicated thermionic tube circuits.

Referring now to the accompanying drawing, this shows diagrammatically a solid material M which is placed in a medium permeable to ultra-sonorous or supersonic waves, for example a bath of water; the material M is subjected to the ultra-sonorous waves generated in a piezo-electric emitting device, the waves passing through the material being received by another piezo-electric device.

These devices are connected, respectively to a generator of high frequency electronic oscillations which are fed to the piezo-electric crystal $Q_E$ of the emitting device by means of the electrodes $EE_1$ and $EE_2$, and to a measuring device, for example a voltmeter energized by an electronic tube or valve connected to an amplifier, which registers the variations of potential produced by the piezo-electric crystal $Q_R$ of the receiving device by means of the electrodes $ER_1$ and $ER_2$.

In the ultra-sonorous wave emitting and receiving devices, the piezo-electric crystals $Q_E$ and $Q_R$ are held in supports $S_E$ and $S_R$ by means of clamping rings $B_E$ and $B_R$. The outlet or entry opening for the ultra-sonorous waves is determined by a plane forming with the axis of the supports an angle equal to the angle of incidence chosen for the waves to impinge on the material M, this angle being smaller than the angle of total reflection.

In order to prevent the production of stationary waves, the inside of each support $S_E$ (and also but not necessarily the support $S_R$) is lined with a sheath $G_E$, ($G_R$) of material which absorbs ultra-sonorous waves, for example impregnated felt, so that the ultra-sonorous waves reflected by the faces of the material M cannot reach the emitting or the receiving piezo-electric crystal. Since the reflected beams of waves are not superposed on the incoming beams, pressure nodes or rises cannot therefore occur.

As regards possible resonances between the piezo-electric crystal of the emitting device and the piezo-electric crystal of the receiving device, such resonances correspond to that of a very loosely-coupled system and are not appreciable in amount.

The novel method for examination of materials by means of ultra-sonorous waves possesses the advantage that no frequency modulation of the waves is required; it is therefore possible to choose single-frequency ultra-sonorous waves having a frequency equal to the natural frequency of the piezo-electric crystals, thereby enabling very high sensitivity to be obtained.

It is obvious that this novel method can be applied either to completely immersed examination systems as above described, or to systems with fluid-tight feelers such as described in my pending application Serial No. 684,614, filed July 18, 1946.

What I claim is:

1. In the art of elastic waves, apparatus for examination of material objects by means of ultra-sonorous waves, comprising a device for emitting ultra-sonorous waves, said emitting device including a tubular support having an open end, a crystal mounted in said support near the other end thereof, said crystal being adapted to produce ultra-sonorous waves, and a sheath lining the inside of said support, said sheath being composed of a material adapted to absorb ultra-sonorous waves, said support being so arranged that a beam of ultra-sonorous waves produced by said crystal and emitted from the open end of said support will strike the surface of the object at an acute angle of incidence smaller than the angle of total reflection, said sheath absorbing any reflected waves entering the open end of said support, a device for receiving the waves of said beam passing through said object, said receiving device including another tubular support having an open end, a crystal mounted in said other support near the other end thereof, said crystal being adapted to respond to ultra-sonorous waves, and a sheath lining the inside of said other support, said sheath being composed of a material adapted to absorb ultra-sonorous waves, said other support being so arranged that a beam of ultra-sonorous waves from said emitting device passing through said object will enter the open end of said other tubular support and excite the crystal therein, said receiving device being so placed that said beam passing directly through said object will enter axially into said other support, and means for measuring the intensity of the excitation of said crystal in said receiving device.

2. In the art of examining solid objects by elastic waves, a wave emitting device comprising a piezo-electric crystal, a tubular support having an open end, means for clamping said crystal in said support near the other end thereof, and a lining of impregnated felt inside said support, the open end of said tubular support being oblique to the axis thereof, and the angle of obliquity of the plane of said open end being smaller than the angle of total reflection of the waves when incident upon the surface of an object under examination in a given liquid medium, in combination with, a wave receiving device comprising a piezo-electric crystal, a tubular support having an open end, means for clamping said crystal in said support near the other end thereof, and a lining of impregnated felt inside said support, the open end of said tubular support being oblique to the axis thereof, the angle of obliquity being the same as the angle of obliquity of the open end of said emitting device.

MARCEL MEUNIER.

REFERENCES CITED

The following references are of record in the file of this patent:

FOREIGN PATENTS

| Number | Country | Date |
|---|---|---|
| 70,301 | Norway | Apr. 23, 1946 |